(12) United States Patent
Butera et al.

(10) Patent No.: US 6,582,294 B2
(45) Date of Patent: Jun. 24, 2003

(54) AIR-MIXING SYSTEM USING A FLUID DEFLECTOR DEVICE OF AN ANALOGICAL TYPE

(75) Inventors: Francesco Butera, Turin (IT); Stefano Alacqua, Rivoli Cascine Vica (IT); Marco Biasiotto, Orbassano (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 10/120,609

(22) Filed: Apr. 12, 2002

(65) Prior Publication Data
US 2002/0151268 A1 Oct. 17, 2002

(30) Foreign Application Priority Data
Apr. 13, 2001 (IT) .......................................... TO01A0361

(51) Int. Cl.[7] ................................................. B60H 1/34
(52) U.S. Cl. ........................................ 454/155; 454/156
(58) Field of Search ....................... 237/12.3 R, 12.3 B; 454/121, 156, 155; 165/41, 42

(56) References Cited

U.S. PATENT DOCUMENTS

| 3,095,799 | A | * | 7/1963 | Pratt | 454/322 |
| 3,926,102 | A | * | 12/1975 | De Lepeleire | 454/290 |
| 5,261,857 | A | * | 11/1993 | Petterson et al. | 454/304 |
| 5,735,338 | A | * | 4/1998 | Chevroulet et al. | 165/42 |
| 5,899,262 | A | * | 5/1999 | Yamaguchi et al. | 165/103 |
| 6,131,652 | A | * | 10/2000 | Ito et al. | 165/203 |
| 6,244,335 | B1 | * | 6/2001 | Nakamura et al. | 165/203 |

* cited by examiner

Primary Examiner—Derek S. Boles
(74) Attorney, Agent, or Firm—Sughrue Mion, PLLC

(57) ABSTRACT

An air-mixing system comprises a fluid deflector device with analogical operation which enables continuous regulation of the distribution of a main flow coming from a main duct into two secondary ducts.

6 Claims, 2 Drawing Sheets

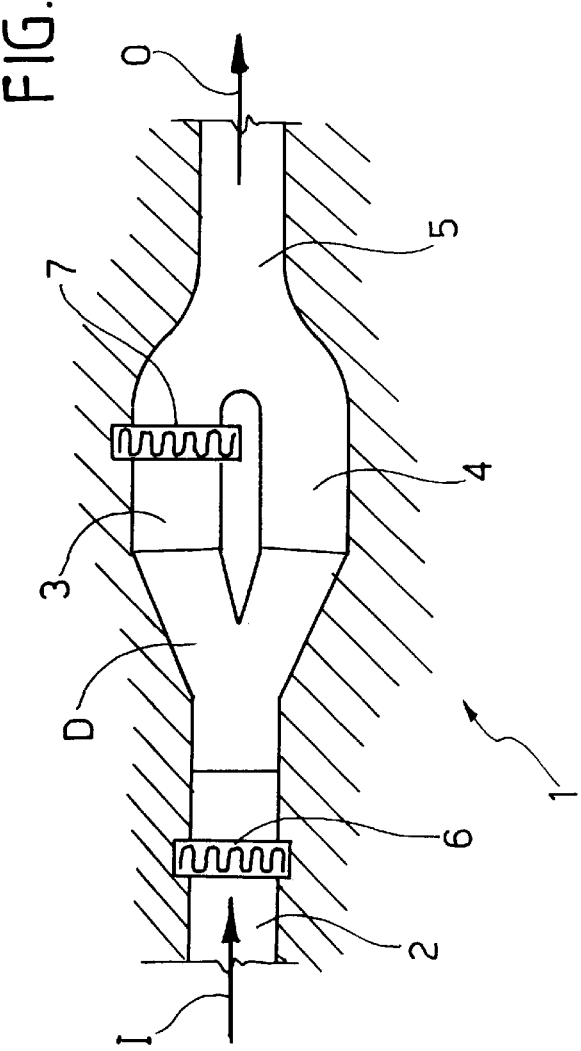
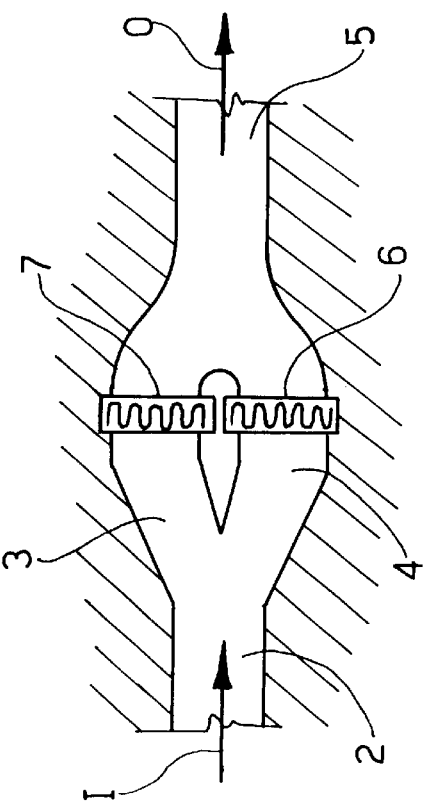

AIR-MIXING SYSTEM USING A FLUID DEFLECTOR DEVICE OF AN ANALOGICAL TYPE

BACKGROUND OF THE INVENTION

The present invention relates to air-mixing systems of the type comprising a deflector device for distribution in an adjustable way of a flow of air coming from a main duct between two or more secondary ducts. The invention relates in particular to the field of air-mixing systems used in air-conditioning systems for motor vehicles. It is, however, of general application and can be used, for example, also in air-mixing systems for residential, commercial or industrial buildings.

The present applicant has already proposed, in the Italian patent application TO2001A000223, filed on Mar. 12, 2001 and still secret at the date of filing of the present application, an air-distributing system comprising a fluid device that enables deviation of a flow of air that passes through a main duct into a first secondary duct and a second secondary duct by exploiting the Coanda effect. The said known system has, however, only two operating conditions corresponding to the sending of the entire flow of air coming from the main duct either into the first secondary duct or into the second secondary duct.

SUMMARY OF THE INVENTION

The purpose of the present invention is to provide an air-mixing system based upon a deflector device of an analogical type, namely a device that is able to ensure continuous regulation of the amount of air that is sent into each of the two secondary ducts between a minimum value and a maximum value, preferably between a zero value and a value corresponding to the entire flow coming from the main duct.

With a view to achieving the above purpose, the subject of the invention is an air-mixing system having the characteristics indicated at the beginning of the present description and being characterized in that said deflector device is a fluid device.

In a first embodiment, the fluid deflector device comprises means for sending a control flow of air, which is adjustable, transversely and selectively from at least one of two opposite sides against the flow of air coming from the main duct so as to deviate continuously the main flow between a first condition in which the entire flow is sent to the first secondary duct and a second condition in which the entire flow coming from the main duct is sent to the second secondary duct.

In a second embodiment, the aforesaid fluid device comprises a flap for guiding the flow, which is set parallel to the flow and is designed to keep the flow coming from the main duct adherent to itself, by the Coanda effect, the said flap being mounted in such a way that is can oscillate between two end-of-travel positions, in order to vary continuously the direction of the main flow between a first condition in which it is sent entirely to the first secondary duct and a second condition in which the main flow is sent entirely to the second secondary duct.

The analogical-type fluid deflector device described above is used in an air-mixing system for regulation of the temperature of the air that is sent, for instance, to an environment which is to be air-conditioned. It may be envisaged, for example, that the entire main air flow will pass through a cooling body to be then distributed between the two secondary ducts, in one of which a heater is set, the two secondary ducts then converging into a single outlet duct set downstream of the heater. Alternatively, it is possible to provide, for example, a refrigerator in one of the two secondary ducts and a heater in the other secondary duct, the said ducts then converging into a single outlet duct in which the flow of air will have a temperature adjustable according to the flow of air passing through the first secondary duct and the flow of air passing through the second secondary duct.

Of course, the fluid device according to the invention can be applied to a wide range of possible types of air-mixing systems, without detriment to the principle underlying the present invention, namely that of applying, to an air-mixing system, a fluid deflector device of an analogical type.

BRIEF DESCRIPTION OF THE DRAWINGS

Further characteristics and advantages of the present invention will emerge from the ensuing description, with reference to the attached drawings, which are provided purely by way of non-limiting example and in which:

FIG. 1 is a schematic view of a first embodiment of an air-mixing system according to the invention;

FIG. 2 is a schematic view of a variant of FIG. 1; and

DETAILED DESCRIPTION OF THE INVENTION

Figure 4:
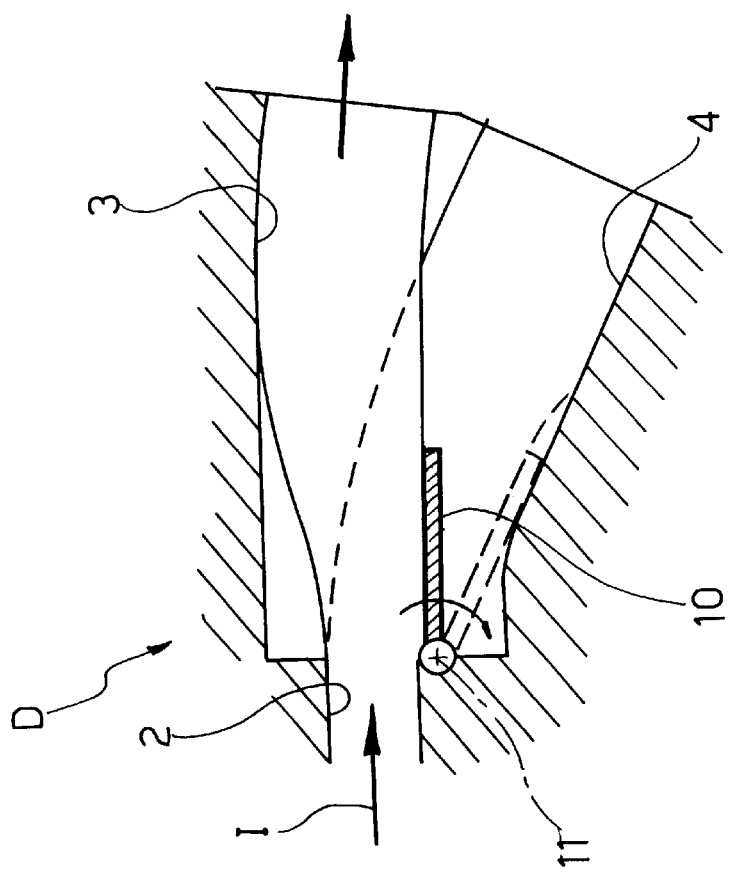
FIGS. 3 and 4 are diagrams illustrating two different embodiments of the fluid device according to the invention.

In FIG. 1, the reference number 1 designates, as a whole, an air-mixing system that can be used, for example, in an air-conditioning system for motor vehicles or for buildings for residential, commercial or industrial use. The system 1 has a main duct 2 which receives a flow I of air coming from the atmosphere. The attached drawings provide a schematic illustration of the system according to the invention and do not enter into the constructional details of the system, including the arrangement for air-filtering systems and the like. The said constructional details are not illustrated in so far as they, taken by themselves, do not fall within the scope of the present invention and in so far as they may be built in any known way. The elimination of said details from the drawings moreover renders the latter more readily and easily understandable. The main duct 2 branches off into a first secondary duct 3 and a second secondary duct 4, which converge into a single outlet duct 5 out of which a flow of air O comes, which is directed to the environment that is to be air-conditioned.

Set at the branching of the main duct 2 into the two secondary ducts 3, 4 is a fluid deflector device D, which will be illustrated in detail in what follows.

In the embodiment illustrated in FIG. 1, a refrigerating body 6 made in any known way is set in the main duct 2, whereas set in the first secondary duct 3 is a heating body 7 (for example a radiator traversed by a hot fluid).

As will emerge clearly from what follows, the deflector device D is able to deflect continuously the main air flow between a first condition in which the entire flow is conveyed into the first secondary duct 3 and a second condition in which the entire flow I is conveyed into the secondary duct 4. Consequently, whilst the entire air flow at inlet is cooled by the body 6, the amount of air that is heated by the body 7 is adjustable in a continuous way. The temperature of the mixed air at outlet from the duct 5 is therefore adjustable accordingly.

FIG. 2 illustrates a variant in which the refrigerating body 6 is set in the second secondary duct 4, instead of in the main duct 2. Also in this case, the temperature of the air flow O at outlet from the duct 5 is a function of the amount of air that traverses the first secondary duct 3, as well as, of course, of the amount of air that traverses the second secondary duct 4.

Figure 3:
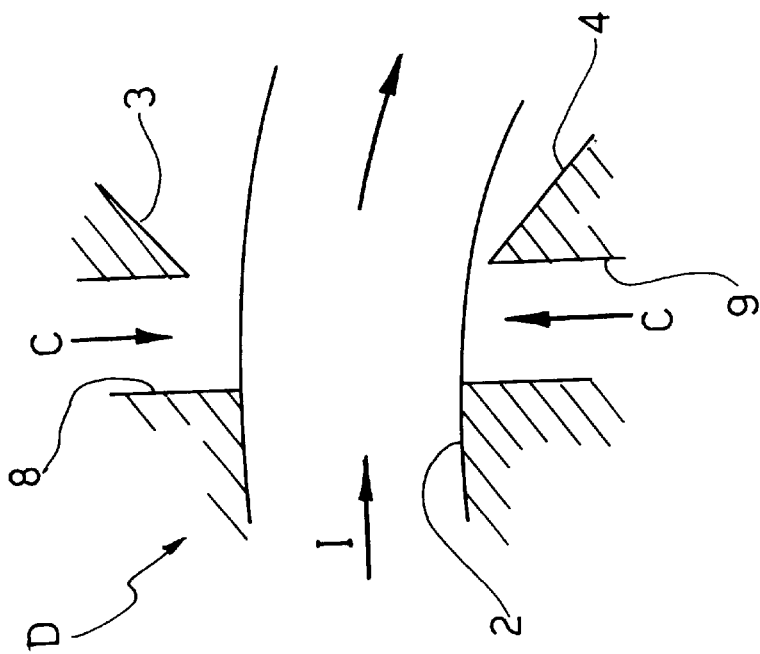

FIGS. 3 and 4 illustrate two examples of embodiment of the fluid deflector device D.

In the case of the embodiment illustrated in FIG. 3, the main flow I may be deviated continuously between the two conditions corresponding to conveyance of the entire flow into the secondary duct 3 and to conveyance of the entire flow into the secondary duct 4, by means of a control flow C that impinges upon the main flow I in a direction transverse to the latter. The control flow C comes from a lateral duct 8 or a lateral duct 9 set opposite to the former duct, according to the type of deviation desired. The control flow C may be generated in a way altogether independent of the main flow I, or else may be generated by drawing off one part of the main flow I upstream of the deflector device. The geometry of the ducts is determined in such a way as to ensure that, by adjusting the control flow C from a minimum value to a maximum value, there will be obtained a continuous regulation of the degree of deviation of the main flow I. In other words, the flow I can be deviated continuously between the two extreme conditions corresponding to the sending of the entire flow into the one and into the other secondary duct 3, 4. Consequently, the amount of air sent to each secondary duct can be regulated continuously between a minimum value and a maximum value, typically between a zero value and a value corresponding to the entire main flow. For this reason, the operation of the fluid device according to the invention is defined as being of an analogical type.

FIG. 4 illustrates a second embodiment in which the fluid deflector device D comprises a flap 10 which is mounted, in an oscillating or deformable way, about an axis 11 with respect to the duct-bearing structure and which can be displaced between two extreme conditions, one of which is indicated by a solid line and the other by a dashed line. With reference to FIG. 4, the geometry and relative arrangement of the ducts, as well as the arrangement of the flap 10 is such that the flow I coming from the main duct 2 adheres to the flap 10 by the Coanda effect. Consequently, if the flap 10 is turned between its two extreme positions (using actuator means of any type—not illustrated), the main flow I remains adherent to said tab flap is deviated accordingly. The degree of deviation is adjustable continuously between the two extreme conditions illustrated in FIG. 4 with the solid line and the dashed line, which respectively correspond to sending of the entire main flow into the first secondary duct 3 and to sending of the entire main flow into the second secondary duct 4. Also in this case, then, the device presents an analogical-type operation, in the sense that it enables continuous variation of the angle of deviation of the main flow I, in order to adjust continuously the amount of air that is conveyed into each of the two secondary ducts 3, 4.

As already mentioned, the device according to the invention can in any case be applied to any other type of air-mixing system without prejudice to the basic idea, which consists, precisely, in applying a fluid deflector device to an air-mixing system.

Of course, without detriment to the principle of the invention, the details of construction and the embodiments may vary widely with respect to what is described and illustrated herein purely by way of example, without thereby departing from the scope of the present invention.

What is claimed is:

1. An air-mixing system comprising:
   a main duct for receiving a flow of air,
   first and second secondary passages into which said main duct is divided at a downstream end of the main duct,
   at least one of said first and second secondary passages being provided with means for bringing temperature of the air flowing through said at least one of said secondary passages to a value different from temperature of the air flowing through other secondary passage,
   an outlet duct into which said first and second secondary passages coverage at their downstream ends, so that the air flowing through said secondary passages is mixed to provide a mixed flow of air into said outlet duct, and
   deflecting means arranged within said main duct for distributing a flow of air coming from the main duct between said first and second secondary passages in such a way that a flow directed to said first and secondary passages can be adjusted continuously between a minimum and a maximum, while a flow directed to said second secondary passage can be adjusted continuously between a maximum and a minimum, which results in a continuous adjustment of temperature of the mixed air flowing through said outlet duct,
   wherein said deflecting means are constituted by a fluidic device.

2. The air-mixing system according to claim 1, wherein said deflecting means comprises means for sending an adjustable control air flow transversely and selectively from at least one of two opposite sides against the air flow coming from the main duct, in such a way as to deviate continuously the main flow between two end conditions one of which corresponds to sending the entire air flow into the first secondary duct and the other of which corresponds to sending the entire main flow into the second secondary duct.

3. The air-mixing system according to claim 1, wherein said deflecting means comprises a flap for guiding the main flow, which is set parallel to the flow and is designed to maintain the main flow adherent to itself by the Coanda effect, said flap being mounted in such a way that it can oscillate or be deformed between two end-of-travel positions so as to vary continuously the direction of the main flow between two extreme conditions in which the main flow is directed entirely either into the first secondary duct or into the second secondary duct.

4. An air-conditioning system comprising an air-mixing system according to claim 1.

5. The air-conditioning system according to claim 4, further comprising a refrigerating body set in the main duct and a heating body set in only one of the two secondary ducts.

6. The air-conditioning system according to claim 4, further comprising a refrigerating body and a heating body respectively set in the first secondary duct and in the second secondary duct.

* * * * *